United States Patent
Rankin et al.

(10) Patent No.: US 12,353,684 B2
(45) Date of Patent: *Jul. 8, 2025

(54) GRAPHICAL USER INTERFACE FOR PARTIAL AMOUNT REDUCTIONS

(71) Applicant: Hint, Inc., Pleasanton, CA (US)

(72) Inventors: Aubrey Eric Rankin, Danville, CA (US); Gaurav Jhaveri, San Mateo, CA (US); Shrankhla Narya, San Francisco, CA (US)

(73) Assignee: Hint, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,364

(22) Filed: Apr. 27, 2023

(65) Prior Publication Data
US 2023/0266868 A1    Aug. 24, 2023

Related U.S. Application Data

(63) Continuation of application No. 17/325,948, filed on May 20, 2021, now Pat. No. 11,675,486.

(51) Int. Cl.
*G06F 3/0484* (2022.01)
*G06F 3/0482* (2013.01)
(Continued)

(52) U.S. Cl.
CPC .......... *G06F 3/0484* (2013.01); *G06F 3/0482* (2013.01); *G06Q 20/127* (2013.01);
(Continued)

(58) Field of Classification Search
CPC ................ G06F 3/0484; G06F 3/0482; G06Q 20/127; G06Q 20/227; G06Q 20/405; G06Q 40/02; G06Q 20/407
See application file for complete search history.

(56) References Cited

U.S. PATENT DOCUMENTS

2007/0133466 A1    6/2007 Promenzio et al.
2013/0191258 A1    7/2013 Zhu et al.
(Continued)

FOREIGN PATENT DOCUMENTS

WO    WO-2020197694 A1    10/2020

OTHER PUBLICATIONS

"U.S. Appl. No. 17/325,948, Non Final Office Action mailed Oct. 14, 2022", 24 pgs.
(Continued)

*Primary Examiner* — Pei Yong Weng
(74) *Attorney, Agent, or Firm* — Ballard Spahr LLP

(57) ABSTRACT

A machine may be configured to facilitate partial reductions of an amount by generating and providing a graphical user interface that enables a user to specify one or more partial reductions of the amount, thus defining or otherwise controlling how the amount is to be reduced in stages by such partial reductions. For example, in situations where a total amount is to be reduced in stages by multiple partial reductions, the generated and provided graphical user interface may be operable to specify each stage of reduction by enabling the user to select a corresponding account for each stage of reduction. The corresponding account may be selected from among a set of multiple available accounts, each with a respectively corresponding available amount, any portion or all of which may be available to use in that stage of reducing the total amount.

20 Claims, 11 Drawing Sheets

(51) Int. Cl.
   *G06Q 20/12* (2012.01)
   *G06Q 20/22* (2012.01)
   *G06Q 20/40* (2012.01)
   *G06Q 40/02* (2023.01)

(52) U.S. Cl.
   CPC ......... *G06Q 20/227* (2013.01); *G06Q 20/405* (2013.01); *G06Q 40/02* (2013.01); *G06Q 20/407* (2013.01)

(56) References Cited

U.S. PATENT DOCUMENTS

2022/0374115 A1  11/2022  Rankin et al.
2022/0374848 A1  11/2022  Rankin et al.

OTHER PUBLICATIONS

"U.S. Appl. No. 17/325,948, Notice of Allowance mailed Feb. 8, 2023", 7 pgs.
"U.S. Appl. No. 17/325,948, Response filed Jan. 6, 2023 to Non Final Office Action mailed Oct. 14, 2022", 14 pgs.
"U.S. Appl. No. 17/325,961, Examiner Interview Summary mailed Feb. 4, 2022", 2 pgs.
"U.S. Appl. No. 17/325,961, Final Office Action mailed Aug. 30, 2022", 22 pgs.
"U.S. Appl. No. 17/325,961, Non Final Office Action mailed Dec. 24, 2021", 20 pgs.
"U.S. Appl. No. 17/325,961, Response filed Mar. 9, 2022 to Non Final Office Action mailed Dec. 24, 2021", 14 pgs.
U.S. Appl. No. 17/325,948, filed May 20, 2021, Graphical User Interface for Partial Amount Reductions.
U.S. Appl. No. 17/325,961, filed May 20, 2021, Graphical User Interface for Partial Amount Reductions.

GRAPHICAL USER INTERFACE FOR PARTIAL AMOUNT REDUCTIONS

CLAIM OF PRIORITY

This application is a continuation of U.S. patent application Ser. No. 17/325,948, filed May 20, 2021, which is incorporated by reference herein in its entirety.

TECHNICAL FIELD

The subject matter disclosed herein generally relates to the technical field of special-purpose machines that generate and provide graphical user interfaces (GUIs), including software-configured computerized variants of such special-purpose machines and improvements to such variants, and to the technologies by which such special-purpose machines become improved compared to other special-purpose machines that generate and provide graphical user interfaces. Specifically, the present disclosure addresses systems and methods to generate and provide a graphical user interface for partial amount reductions.

BACKGROUND

A machine may be configured to interact with one or more users by generating a GUI and providing the generated GUI for interaction with one or more users. For example, the machine may cause the GUI to be presented (e.g., displayed) to a user, such as via a display screen of the machine or via a display screen of a device communicatively coupled to the machine (e.g., by one or more networks). The GUI may be operable to specify or otherwise control how one or more actions (e.g., transactions) are performed by the machine or otherwise caused by the machine. Accordingly, the machine may be configured to handle user input (e.g., receive, detect, or otherwise access such user input) submitted via the GUI, and the machine may responsively initiate or otherwise cause one or more actions to be performed (e.g., by the machine, by the device, or any suitable combination thereof) based on the user input submitted via the GUI.

BRIEF DESCRIPTION OF THE DRAWINGS

Some embodiments are illustrated by way of example and not limitation in the figures of the accompanying drawings.

DETAILED DESCRIPTION

Figure 1:
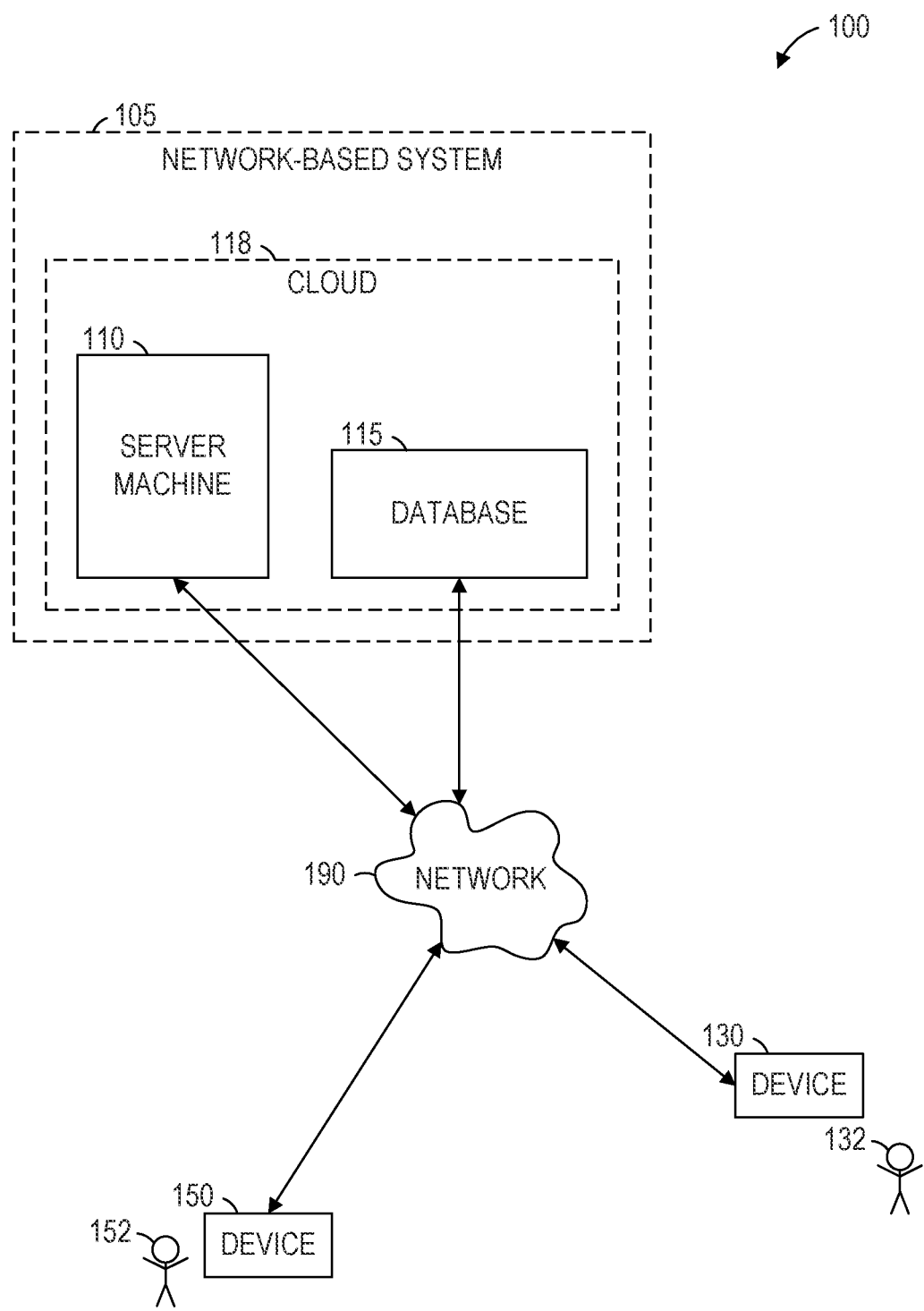
FIG. 1 is a network diagram illustrating a network environment suitable for generating and providing a GUI for partial amount reductions, according to some example embodiments.

Example methods (e.g., algorithms) facilitate generation, provision, or both, of a GUI operable to specify and initiate partial amount reductions, and example systems (e.g., special-purpose machines configured by special-purpose software) are configured to facilitate generation, provision, or both, of such a GUI. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

In accordance with the example methods and example system discussed herein, a machine may be configured to facilitate partial reductions of an amount (e.g., a value, a count, or other quantity expressed as a number, with or without units) by generating and providing a GUI that enables a user to specify one or more partial reductions of the amount, thus defining or otherwise controlling how a total amount is to be reduced in stages by the partial reductions. For example, in situations where a total amount is to be reduced in multiple stages by multiple partial reductions, the generated and provided GUI may be operable to specify each individual stage of reduction by enabling the user to select a corresponding account for each stage of reduction. The corresponding account may be selected from among a set of multiple available accounts, each with a respectively corresponding available amount, any portion or all of which may be available to use in that stage of reducing the total amount. The GUI may be operable to designate, authorize, or both, a specific account (e.g., authorized and designated for this stage of reduction) and a specific amount (e.g., authorized and designated for this stage of reduction) to be consumed from that specific account for use in reducing the total amount. Furthermore, when any given stage of reduction is specified by its corresponding account and its corresponding amount, the machine may initiate or otherwise cause the corresponding partial reduction of the total amount to occur (e.g., via a transaction), and the machine may update or otherwise modify the GUI to indicate initiation, execution, completion, or any suitable combination thereof, of that stage of reduction.

In some example embodiments, the machine generates a GUI that indicates a total amount to be reduced in stages by multiple partial reductions, and then causes presentation of the GUI (e.g., by the machine or by another machine, such as a device). The GUI includes multiple authorization elements (e.g., GUI elements operable to specify an authorization) that are each separately operable to specify a respective corresponding partial reduction among the multiple partial reductions for the total amount. The machine responds to a first authorization element among the multiple authorization elements of the presented GUI being operated to specify a first partial reduction of the total amount along with a first account, among multiple available accounts, from which to transact a first authorized amount of the first partial reduction, by transacting the first authorized amount from the specified first account. In response to the transacting of the first authorized amount from the specified first account, the machine may modify the GUI to indicate the total amount and its partial reduction by at least the first authorized amount. Subsequently, the machine responds to a second authorization element among the multiple authorization elements being operated to specify a second partial reduction of the reduced total amount along with a second account, among the multiple available accounts, from which to transact a second authorized amount of the second partial reduction, by transacting the second authorized amount from the specified second account. In response to the transacting of the second authorized amount from the specified second account, the machine may modify the GUI to indicate the total amount and its reduction by at least the first authorized amount and the second authorized amount.

In certain example embodiments, the machine generates a GUI that indicates a total amount to be reduced in stages by multiple partial reductions, and then causes presentation of the GUI (e.g., by the machine or by another machine, such as by a device). The GUI includes multiple authorization elements that are each separately operable to specify a respective corresponding partial reduction among the multiple partial reductions for the total amount. The machine responds to a first authorization element among the multiple authorization elements of the presented GUI being operated to specify a first partial reduction of the total amount along with a first account, among multiple available accounts, from which to transact a first authorized amount of the first partial reduction, by transacting the first authorized amount from the specified first account. Moreover, the first account may correspond to an accumulated amount gathered from a periodic series of transactions authorized to occur periodically. In response to the transacting of the first authorized amount from the specified first account, the machine may modify the GUI to indicate the total amount and its partial reduction by at least the first authorized amount, which may be taken from the accumulated amount gathered from the periodic series of transactions authorized to occur periodically. Further details are described below.

FIG. 1 is a network diagram illustrating a network environment 100 suitable for generating and providing a GUI for partial amount reductions, according to some example embodiments. The network environment 100 includes a server machine 110, a database 115, and devices 130 and 150, all communicatively coupled to each other via a network 190. The server machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the devices 130 and 150). The server machine 110, the database 115, and the devices 130 and 150 may each be implemented in a special-purpose (e.g., specialized) computer system, in whole or in part, as described below with respect to FIG. 11. Any one or more of the example methods discussed herein may be performed, in full or in part, by the server machine 110, by one or more of the devices 130 and 150, or any suitable combination thereof.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130. For example, the device 130 may be a desktop computer, a vehicle computer, a home media system (e.g., a home theater system or other home entertainment system), a tablet computer, a navigational device, a portable media device, a smart phone, or a wearable device (e.g., a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a home media system (e.g., a home theater system or other home entertainment system), a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 11, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured in any of various ways, for example, as a text file, a table, a spreadsheet, a relational database (e.g., an object-relational database), a triple store, a hierarchical data store, a document database, a graph database, key-value pairs, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone service (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
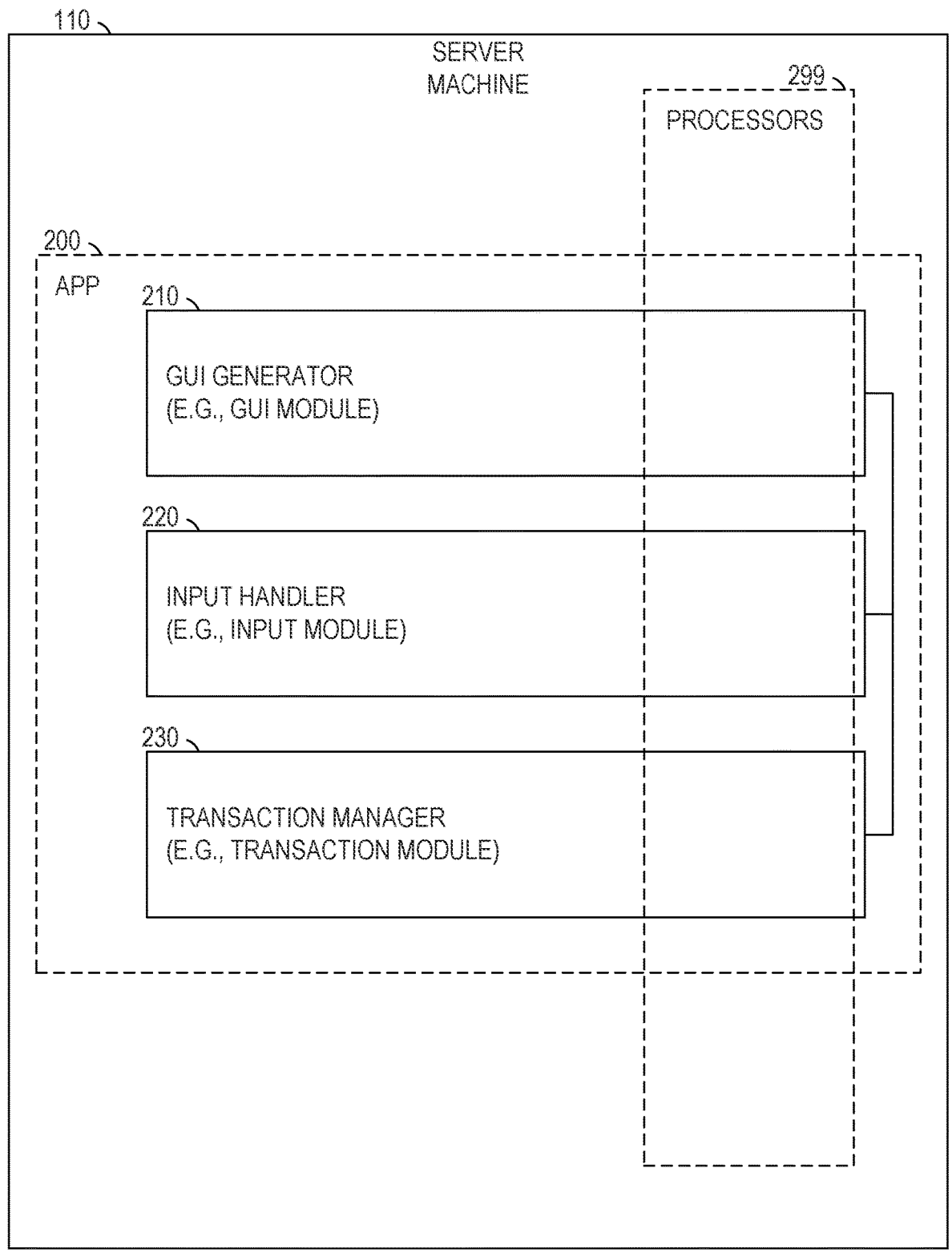
FIG. 2 is a block diagram illustrating components of a server machine suitable for generating and providing a GUI for partial amount reductions, according to some example embodiments.

FIG. 2 is a block diagram illustrating components of the server machine 110, suitably configured for generating and providing a GUI for partial amount reductions, according to some example embodiments. The server machine 110 is shown as including a GUI generator 210 (e.g., a GUI module or suitable code configured to generate a GUI), an input handler 220 (e.g., an input module or suitable code configured to handle user input), and a transaction manager 230 (e.g., a transaction module or suitable code configured to manage one or more transactions), all configured to communicate with each other (e.g., via a bus, shared memory, or a switch).

As shown in FIG. 2, the GUI generator 210, the input handler 220, and the transaction manager 230 may form all or part of an app 200 (e.g., a server app) that is stored (e.g., installed) on the server machine 110 (e.g., responsive to or otherwise as a result of data being received via the network 190). Furthermore, one or more processors 299 (e.g., hardware processors, digital processors, or any suitable combination thereof) may be included (e.g., temporarily or permanently) in the app 200 the GUI generator 210, the input handler 220, the transaction manager 230, or any suitable combination thereof.

Figure 3:
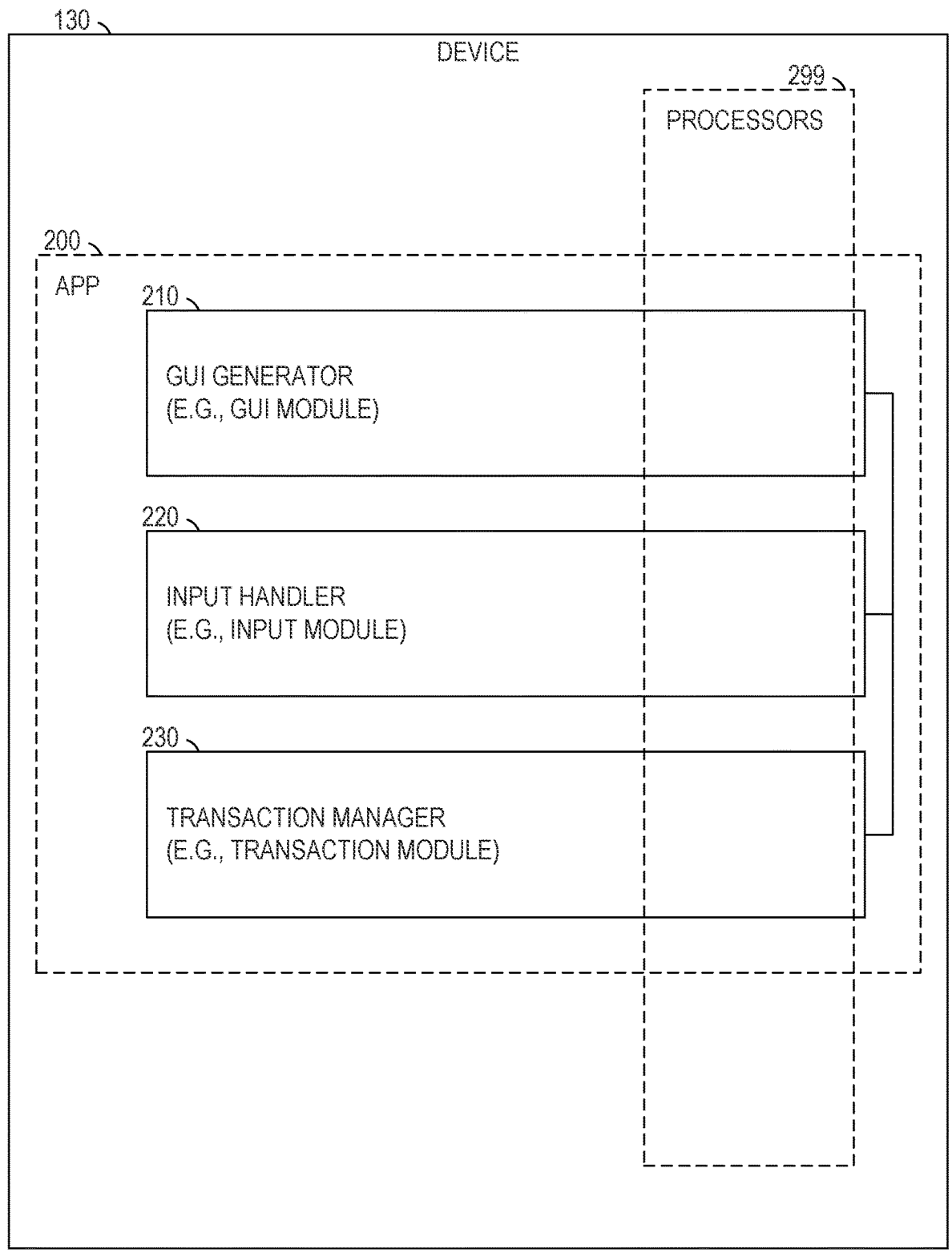
FIG. 3 is a block diagram illustrating components of a device suitable for generating and providing a GUI for partial amount reductions, according to some example embodiments.

FIG. 3 is a block diagram illustrating components of the device 130, suitably configured for generating and providing a GUI for partial amount reductions, according to some example embodiments. The device 130 is shown as including an instance of the GUI generator 210 (e.g., a GUI module or suitable code configured to generate a GUI), an instance of the input handler 220 (e.g., an input module or suitable code configured to handle user input), and an instance of the transaction manager 230 (e.g., a transaction module or suitable code configured to manage one or more transactions), all configured to communicate with each other (e.g., via a bus, shared memory, or a switch).

As shown in FIG. 3, the GUI generator 210, the input handler 220, and the transaction manager 230 may form all or part of an instance of the app 200 (e.g., a mobile app) that is stored (e.g., installed) on the device 130 (e.g., responsive to or otherwise as a result of data being received via the network 190). Furthermore, one or more processors 299 (e.g., hardware processors, digital processors, or any suitable combination thereof) may be included (e.g., temporarily or permanently) in one or more instances of the app 200, the GUI generator 210, the input handler 220, the transaction manager 230, or any suitable combination thereof.

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 4:
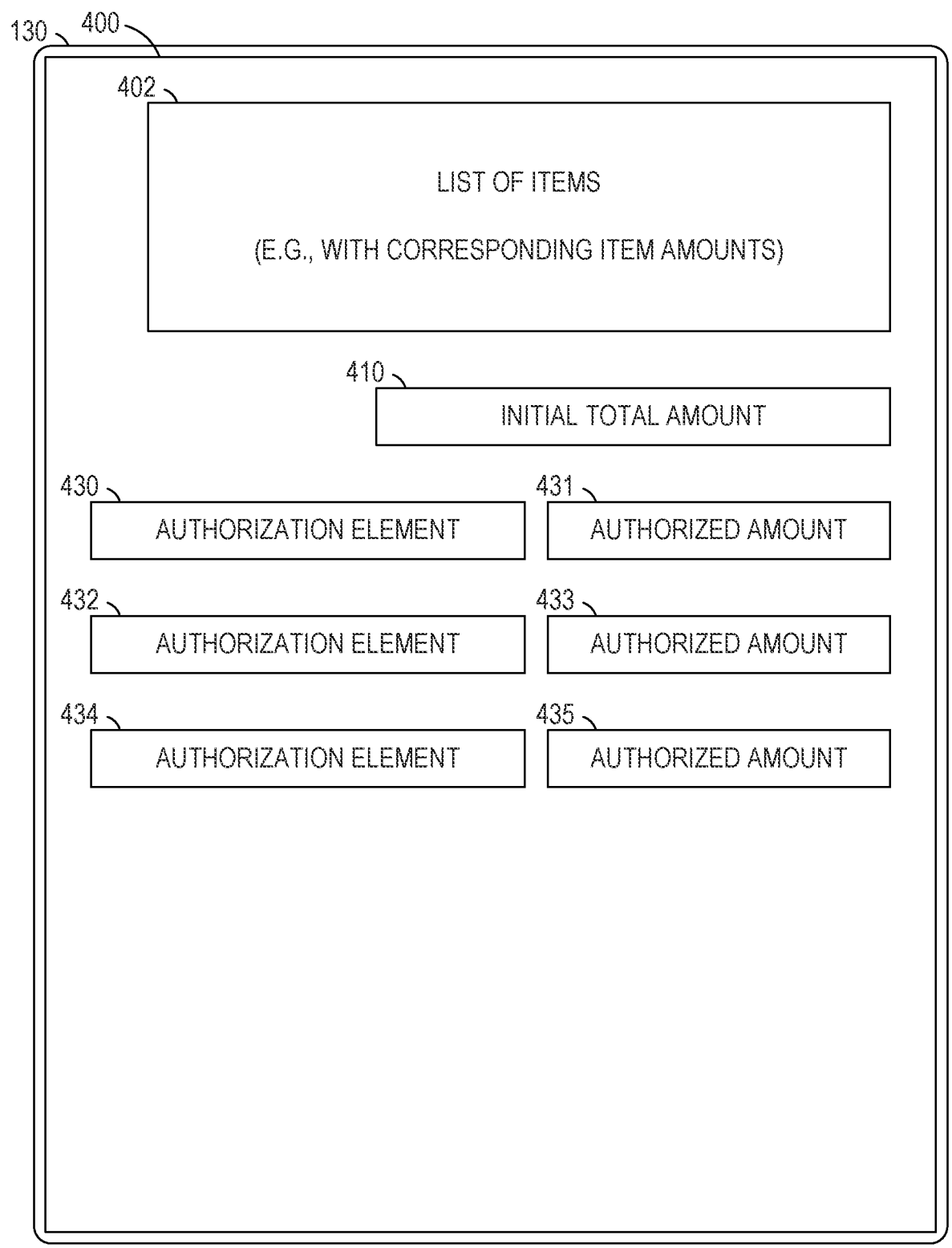
FIGS. 4-6 are diagrams of a device presenting a GUI for partial amount reductions, according to some example embodiments.
Figure 5:
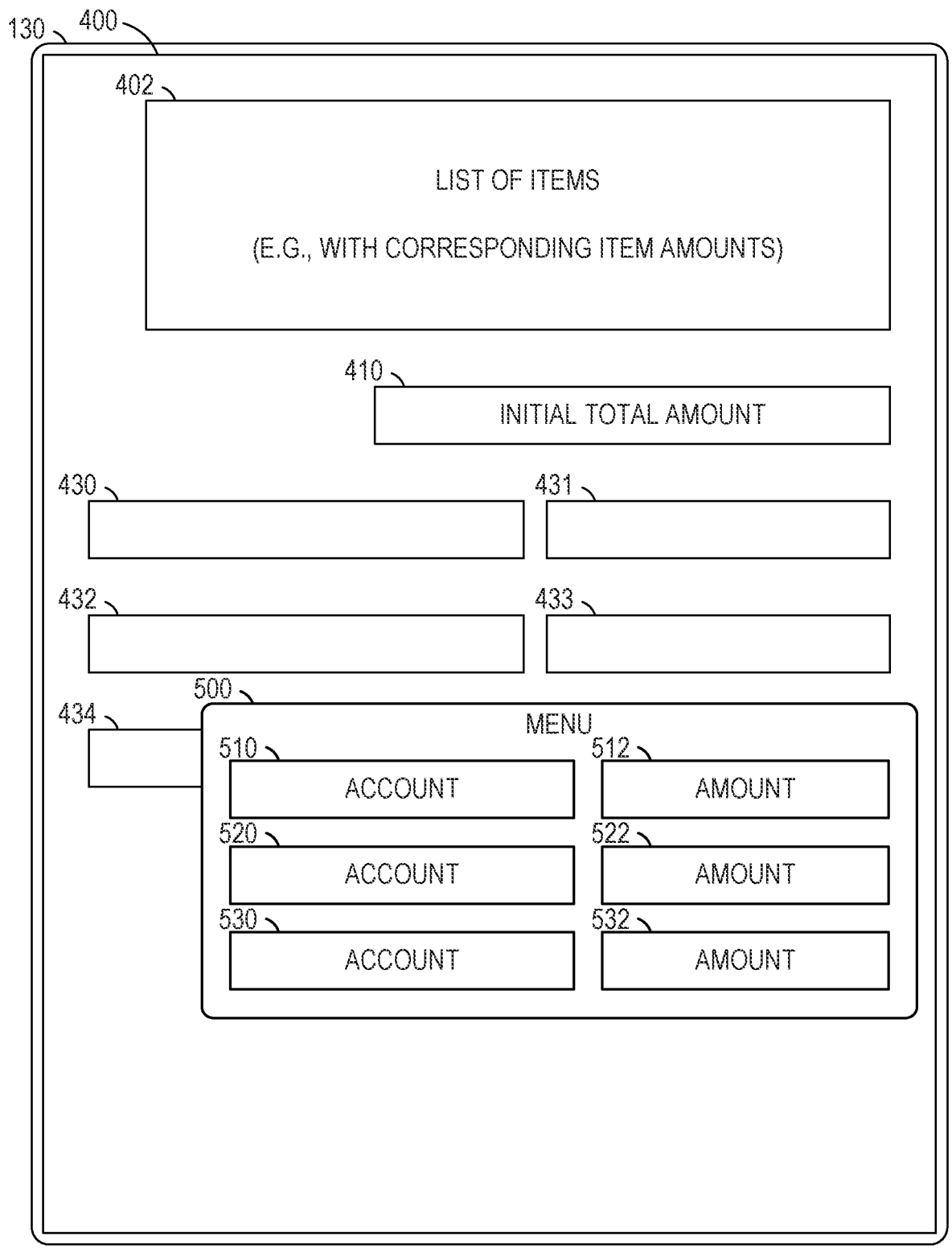
Figure 6:
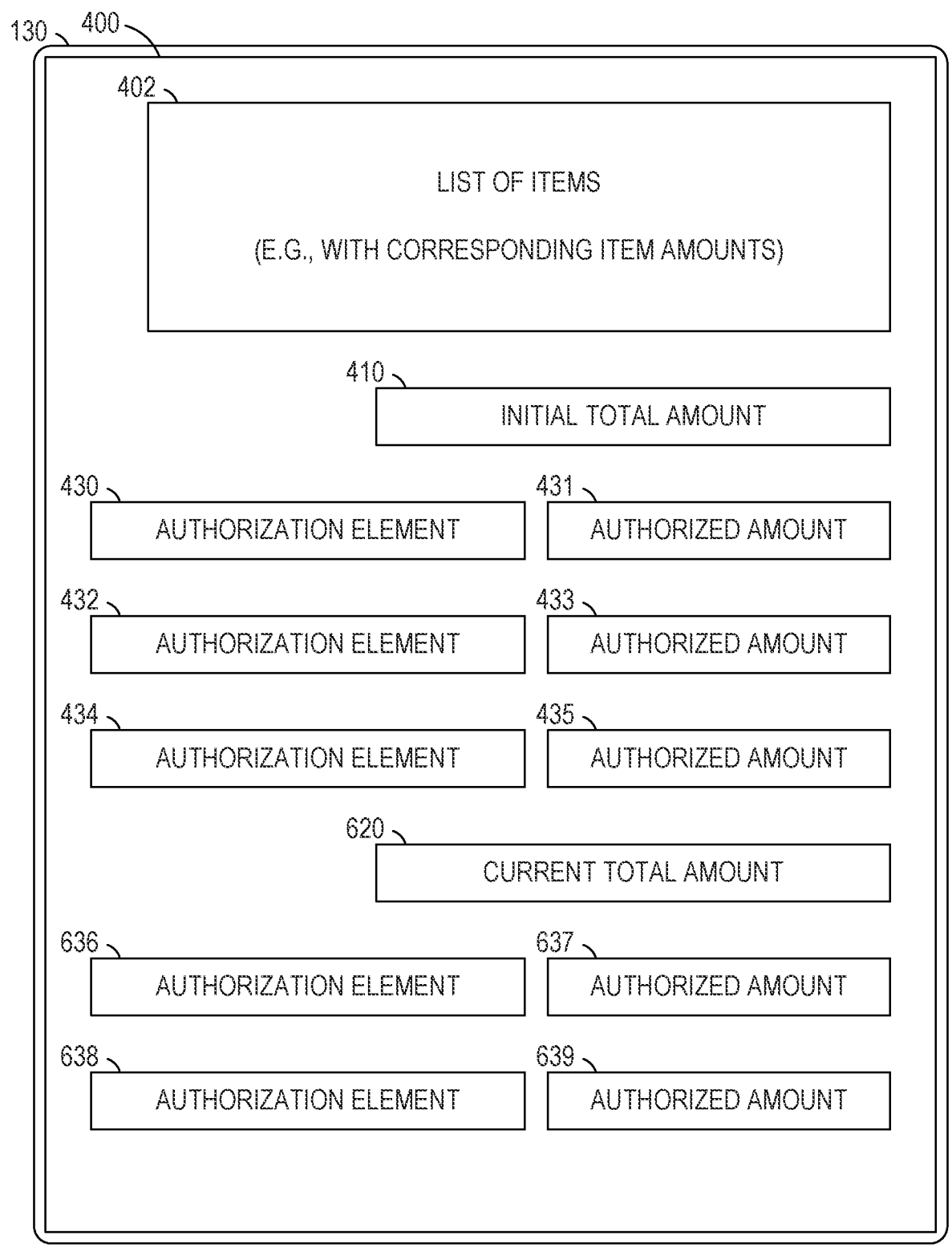

FIGS. 4-6 are diagrams of the device 130 presenting a GUI 400 for partial amount reductions, according to some example embodiments. As shown in FIG. 4, the GUI 400 enables a user (e.g., user 132 of the device 130) to specify multiple partial reductions of an initial total amount 410, thus defining or otherwise controlling how the initial total amount 410 is to be reduced in stages by the multiple partial reductions. For example, a list 402 of items may indicate one or more items, and each of the one or more items may be indicated along with a corresponding item amount, such that a sum of these item amounts equals the initial total amount 410. Generation, provision, presentation, and operation of the GUI 400 may accordingly be appropriate in situations where the initial total amount 410 is to be reduced in multiple stages by multiple partial reductions.

To address such situations, the GUI 400 includes a set of authorization elements 430, 432, and 434. Each one of these authorization elements 430, 432, and 434 is operable by the user (e.g., user 132) to specify one or more details for a respectively corresponding individual stage of reduction among the multiple stages of reduction. For example, the authorization element 430 is operable to select or otherwise specify a corresponding account (e.g., a first account) and a corresponding authorized amount 431 (e.g., a first authorized amount) of reduction, which designates and authorizes that account (e.g., the first account) for use in the corresponding stage (e.g., a first stage) of reducing the initial total amount 410 by the corresponding authorized amount 431 (e.g., the first authorized amount).

Similarly, the authorization element 432 is operable to select or otherwise specify a corresponding account (e.g., a second account) and a corresponding authorized amount 433 (e.g., a second authorized amount) of reduction, which designates and authorizes that account (e.g., the second account) for use in the corresponding stage (e.g., a second stage) of reducing the initial total amount 410 by the corresponding authorized amount 433 (e.g., the second authorized amount). Likewise, the authorization element 434 is operable to select or otherwise specify a corresponding account (e.g., a third account) and a corresponding authorized amount 435 (e.g., a third authorized amount) of reduction, which designates and authorizes that account (e.g., the third account) for use in the corresponding stage (e.g., a third stage) of reducing the initial total amount 410 by the corresponding authorized amount 435 (e.g., the third authorized amount).

In the operation of any authorization element (e.g., authorization element 430) for the GUI 400, the corresponding account may be specified by user selection from among a set of multiple available accounts, each with a respectively corresponding available amount, some or all of which may be available to use in the corresponding stage (e.g., the first stage) of reducing the initial total amount 410. Accordingly, as shown in FIG. 5, operation of the authorization element 434 may cause the GUI 400 to present a menu 500 (e.g., as a pop-up window, a pull-down menu, or any other suitable selection interface). The menu 500 includes and indicates that accounts 510, 520, and 530 are available for use in specifying at least one partial reduction of the initial total amount 410, namely, at least the partial reduction that corresponds to the operated authorization element 434.

Furthermore, the menu 500 includes and indicates that the available account 510 corresponds to an available amount 512, some or all of which may be used to set or otherwise specify the corresponding authorized amount 431 for the authorization element 430. Similarly, the menu 500 includes and indicates that the available account 520 corresponds to an available amount 522, some or all of which may be used to specify the corresponding authorized amount 431 for the authorization element 430, and the menu 500 includes and indicates that the available account 530 corresponds to an available amount 532, some or all of which may be used to specify the corresponding authorized amount 431 for the authorization element 430.

The user 132 may operate the menu 500 to select, for example, the available account 510 by activating (e.g., tapping or clicking) the available account 510 or its available amount 512. Once the available account 510 is selected (e.g., designated, authorized, or both) for use with the authorization element 434, the GUI 400 may close the menu 500 and return to the appearance shown in FIG. 4. Thus, the GUI 400 may be operable to specify (e.g., designate, authorize, or both) a specific account (e.g., authorized and designated for this stage of reduction) and a specific amount (e.g., authorized and designated for this stage of reduction) to be consumed from that specific account for use in reducing the total amount (e.g., the initial total amount 410).

Furthermore, when any given stage of reduction is specified by its corresponding account and its corresponding amount, the machine may promptly (e.g., immediately) initiate or otherwise cause the corresponding partial reduction of the total amount to occur (e.g., via a transaction), and the machine may update or otherwise modify the GUI to indicate initiation, execution, completion, or any suitable combination thereof, of that stage of reduction. Accordingly, according to various example embodiments of the GUI 400, the user 132 may sequentially specify (e.g., designate and authorize) a series of partial reductions of the initial total amount 410, and each one of these partial reductions may be caused to be executed or otherwise transacted promptly upon becoming specified (e.g., by a corresponding authorization element, such as the authorization element 430) within the GUI 400. This may contrast with example embodiments in which multiple partial reductions are specified as a batch without causing their corresponding transactions to occur yet, with such transactions occurring as a batch only after operation of a control element configured to initiate such a batch execution of the specified transactions.

In various example embodiments, any one or more authorization elements (e.g., authorization element 430) is further operable to undo (e.g., cancel, delete, void, or reverse) the partial reduction that was specified earlier via that authorization element. For example, such an authorization element may include or appear with an icon that is operable to initiate an undo operation for the previously specified partial reduction of the total amount. After activation of such an icon, the authorization element may cause the previously specified partial reduction to be cancelled, deleted, voided, or reversed (e.g., promptly upon activation of the icon). Furthermore, the authorization element may return to a state (e.g., with blanked fields) of being operable to specify a corresponding partial reduction of the total amount.

In certain example embodiments, any one or more authorization element (e.g., authorization element 430) is additionally operable to modify (e.g., edit or change) the partial reduction that was specified earlier via that authorization element. For example, such an authorization element may include or appear with an icon that is operable to initiate an edit operation for the previously specified partial reduction of the total amount. After completion of such an edit operation, the authorization element may undo the previously specified partial reduction of the total amount and instead cause the edited partial reduction to be executed or otherwise transacted (e.g., promptly upon becoming specified by the edit operation).

In some example embodiments, the GUI 400 is modified (e.g., updated) after each stage of reduction for the initial total amount 410. For example, after the authorization element 434 (e.g., a third authorization element) is operated by the user 132 to specify a corresponding stage (e.g., a third stage) of reduction for the initial total amount 410, the GUI 400 may be updated to have the appearance shown in FIG. 6, with a current total amount 620 displayed to indicate an extent of progress made by the executed or otherwise transacted partial reductions specified thus far in the GUI 400 (e.g., by operation of the authorization elements 430, 432, and 434, and setting or otherwise specifying their corresponding authorized amounts 431, 433, and 435, respectively). The displaying of the current total amount 620 may thus indicate how much of the initial total amount 410 remains to be reduced by one or more further stages of reduction. In many situations, the user 132, an operator of the server machine 110, or both, find it helpful to reduce the initial total amount 410 to zero, via multiple partial reductions to be specified by operation of the GUI 400.

As also shown in FIG. 6, when displaying the current total amount 620 (e.g., with or without concurrent display of the initial total amount 410), the GUI 400 may include one or more additional authorization elements 636 and 638, with or without respectively corresponding additional authorized amounts 637 and 639. Similar to the previously discussed authorized amounts 431, 433, and 435, one or more of the additional authorized amounts 637 and 639 may be operable to select or otherwise specify an authorized amount of reduction for the corresponding stage of reduction.

FIGS. 7-10 are flowcharts illustrating operations of the server machine 110 or the device 130 in performing a method 700 of providing the GUI 400 for partial amount reductions, according to some example embodiments. Operations in the method 700 may be performed by the server machine 110, the device 130, or a combination of both, using components (e.g., modules) described above with respect to FIGS. 2 and 3, using one or more processors (e.g., processors 299 or other hardware processors, such as microprocessors), or using any suitable combination thereof.

Figure 7:
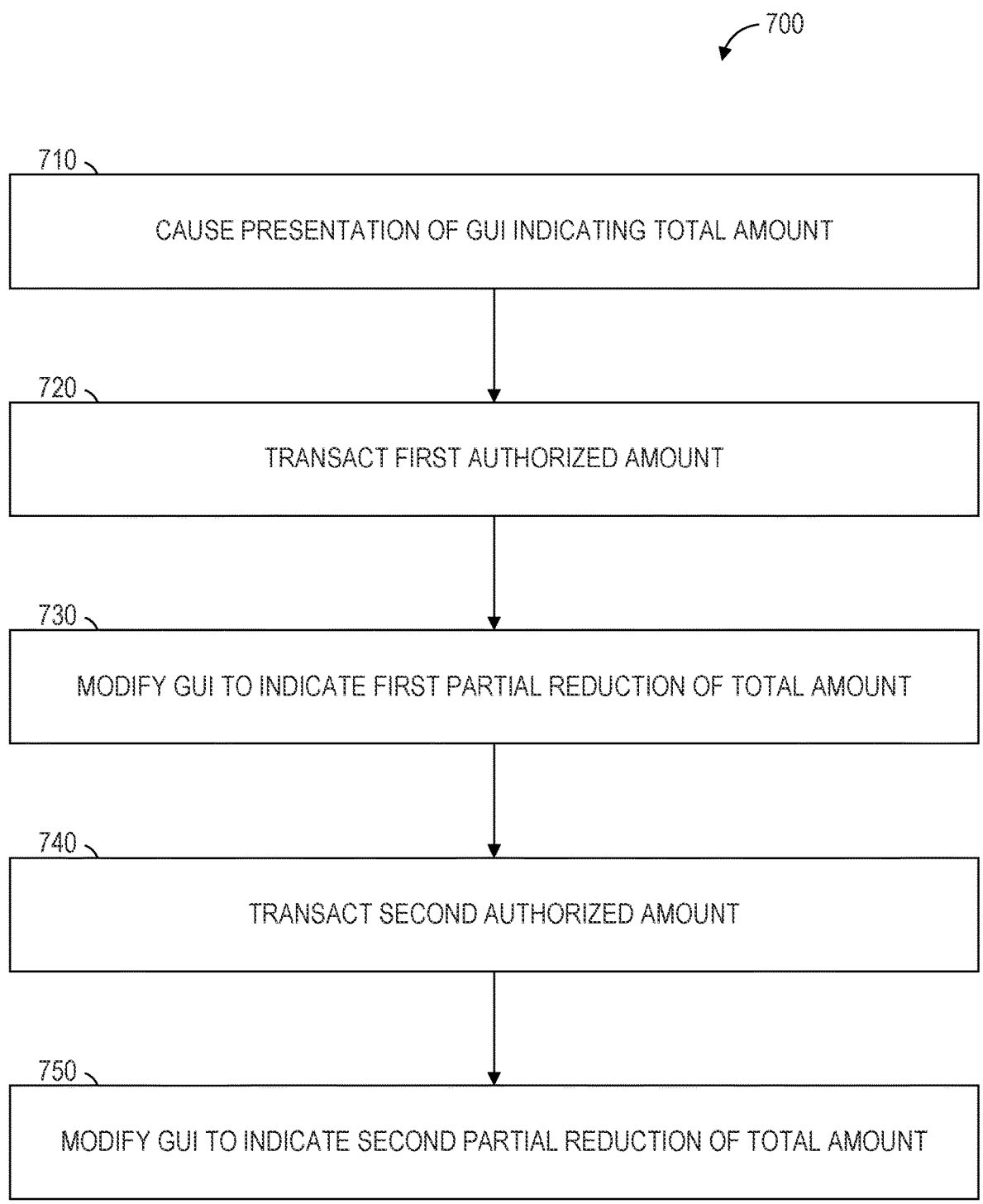
FIGS. 7-10 are flowcharts illustrating operations of the server machine or the device in performing a method of providing a GUI for partial amount reductions, according to some example embodiments.

In some example embodiments, by promptly causing transaction (e.g., execution) of each partial reduction at each stage of reduction, the GUI 400 is robust and withstands accidental or deliberate interruptions (e.g., in network connectivity) as the user 132 specifies various details for multiple stages of reduction for the initial total amount 410. Accordingly, as shown in FIG. 7, some example embodiments of the method 700 include operations 710, 720, 730, 740, and 750.

In operation 710, the GUI generator 210 generates the GUI 400. As noted above, the generated GUI 400 indicates a total amount (e.g., initial total amount 410) to be reduced in stages by multiple partial reductions, and then causes presentation of the GUI 400 (e.g., display of the GUI 400 by the server machine 110, by the device 130, or by a display screen communicatively coupled thereto). As noted above, the GUI 400 includes multiple authorization elements (e.g., authorization elements 430, 432, and 434) that are each separately operable to specify a respective corresponding partial reduction among the multiple partial reductions for the total amount (e.g., the initial total amount 410) indicated by the GUI 400.

In operation 720, the transaction manager 230 responds to a first authorization element (e.g., authorization element 434) being operated to specify a first partial reduction of the total amount (e.g., the initial total amount 410) along with a first account (e.g., available account 510) from which to transact a first authorized amount (e.g., authorized amount 435 for the authorization element 434) of the first partial reduction. Specifically, the response of the transaction manager 230 is or includes transacting (e.g., executing) the first authorized amount (e.g., authorized amount 435) from the specified first account (e.g., available account 510). As discussed below, the input handler 220 may have previously detected the operation of the first authorization element (e.g., authorization element 434) prior to the response thereto by the transaction manager 230 here in operation 720.

In operation 730, in response to the transacting of the first authorized amount (e.g., authorized amount 435) from the specified first account (e.g., available account 510), the GUI generator 210 modifies (e.g., updates) the GUI 400 to indicate the total amount (e.g., initial total amount 410) and its partial reduction by at least the first authorized amount (e.g., by displaying the first authorized amount, the current total amount 620, or both).

In operation 740, the transaction manager 230 responds to a second authorization element (e.g., authorization element 636) being operated to specify a second partial reduction of the reduced total amount (e.g., current total amount 620) along with a second account (e.g., available account 520) from which to transact a second authorized amount (e.g., authorized amount 637 for the authorization element 636) of the second partial reduction. Specifically, the response of the transaction manager 230 is or includes transacting (e.g., executing) the second authorized amount (e.g., authorized amount 637) from the specified second account (e.g., authorized account 520). As discussed below, the input handler 220 may have previously detected the operation of the second authorization element (e.g., authorization element 636) prior to the response thereto by the transaction manager 230 here in operation 740.

In operation 750, in response to the transacting of the second authorized amount (e.g., authorized amount 637) from the specified second account (e.g., available account 510), the GUI generator 210 modifies (e.g., updates) the GUI 400 to indicate the total amount (e.g., initial total amount 410, current total amount 620, or both) and its full or partial reduction by at least the first authorized amount and the second authorized amount (e.g., by displaying the first authorized amount, the second authorized amount, a sum thereof, an updated version of the current total amount 620, or any suitable combination thereof).

Figure 8:
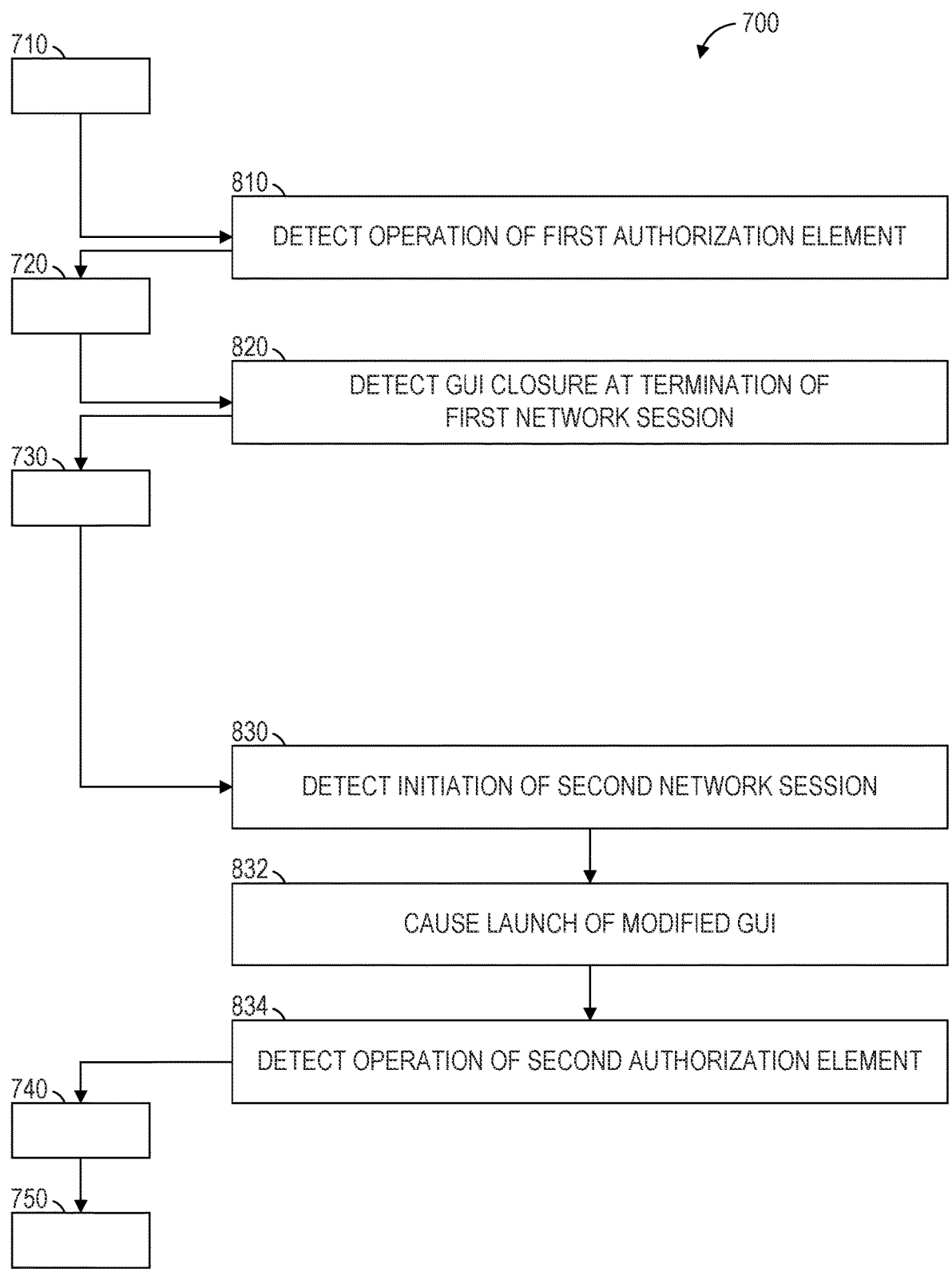

As shown in FIG. 8, in addition to any one or more of the operations previously described, the method 700 may include one or more of operations 810, 820, 830, 832, and 834, which facilitate the robustness of the GUI 400 to a network interruption, in the example form of a termination of one network session and a subsequent initiation of another network session.

Operation 810 is shown as being performed after operation 710 and before operation 720. In operation 810, the input handler 220 receives an indication, or otherwise detects, that the first authorization element (e.g., authorization element 434) among the multiple authorization elements (e.g., authorization elements 430, 432, and 434) of the presented GUI 400 has been operated (e.g., by the user 132) to specify the first partial reduction of the total amount (e.g., the initial total amount 410) and to specify the first account (e.g., available account 510), among multiple available accounts (e.g., available accounts 510, 520, and 530), from which to transact the first authorized amount (e.g., authorized amount 431 for the authorization element 430) of the first partial reduction.

Operation 820 is shown in FIG. 8 as being performed after operation 720 and before operation 730. In operation 820, the input handler 220 receives an indication, or otherwise detects, that the GUI 400 has been closed after the transacting of the first authorized amount (e.g., authorized amount 435) from the specified first account (e.g., available account 510). The detected closure of the GUI 400 may indicate a termination of a first network session during which operation 710 was performed.

Operations 830, 832, and 834 are shown in FIG. 8 as being performed after operation 730 and before operation 740. In operation 830, the GUI generator 210 receives an indication, or otherwise detects, that a second network session has been initiated. In operation 832, in response to the detected initiation of the second network session after the modifying of the GUI 400 (e.g., in operation 730) to indicate the total amount (e.g., initial total amount 410, current total amount 620, or both) and its partial reduction by at least the first authorized amount (e.g., authorized amount 435), the GUI generator 210 causes a launch (e.g., initiation of a presentation) of the GUI 400, which has been modified to indicate the total amount and its partial reduction by at least the first authorized amount.

In some example embodiments, the closure of the GUI 400 (e.g., as detected in operation 820) indicates the termination of the first network session at a first device (e.g., device 130), and the initiation of the second network session (e.g., as detected in operation 830) occurs at the same first device (e.g., device 130) at which the first network session terminated. Accordingly, the user 132 may operate the GUI 400 under one network session using the device 130 and later continue operating the same GUI 400 under another network session using the same device 130.

In other example embodiments, the closure of the GUI 400 (e.g., as detected in operation 820) indicates the termination of the first network session at the first device (e.g., device 130), but the initiation of the second network session (e.g., as detected in operation 830) occurs at a different, second device (e.g., device 150) that is distinct from the first device at which the first network session terminated. Accordingly, the user 132 may operate the GUI 400 under one network session using the device 130 and later continue operating the same GUI 400 under another network session using a different device 150.

In operation 834, the input handler 220 receives an indication, or otherwise detects, that the second authorization element (e.g., authorization element 636) among the multiple authorization elements (e.g., authorization elements 430, 432, 434, and 636) of the presented GUI 400 has been operated (e.g., by the user 132) to specify the second partial reduction of the total amount (e.g., current total amount 620, which has been reduced from the initial total amount 410) and to specify the second account (e.g., available account 520), among multiple available accounts (e.g., available accounts 520 and 530), from which to transact the second authorized amount (e.g., authorized amount 637) of the second partial reduction. The detection of the operation of the second authorization element (e.g., authorization element 636) may serve as a basis for performance of operation 740, as described above.

Figure 9:
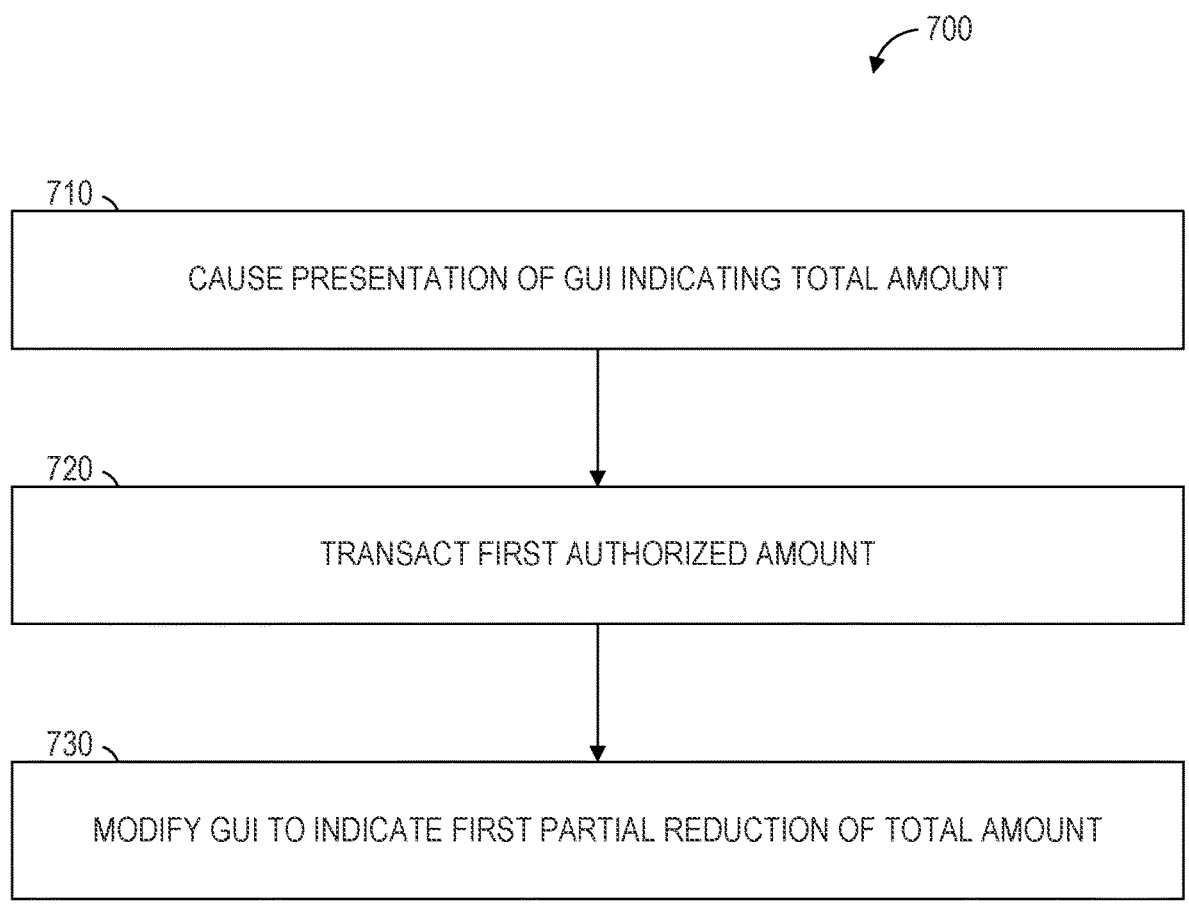

Turning to FIG. 9, in certain example embodiments, one or more of the available accounts (e.g., available account 510) is an accumulated account, and its corresponding available amount (e.g., available amount 512) is an accumulated amount that has been accumulated (e.g., gathered, collected, or saved up) from a periodic series of transactions that have been authorized to occur periodically (e.g., in exchange for a subscription to something). For example, the user 132 may have previously subscribed to a periodic (e.g., weekly, monthly, semi-monthly, quarterly, or annually) subscription in which a periodic transaction of a periodic amount is authorized to occur, such that in each periodic transaction, the periodic amount is added to the accumulated amount of the accumulated account. Although these periodic transactions may have been authorized for the subscription, the menu 500 of the GUI 400 may include the accumulated account (e.g., available account 510) and thus indicate that the accumulated account is available for repurposed or otherwise redirected usage as an available account (e.g., available account 510) for the corresponding stage of reduction for the initial total amount 410 (e.g., as well as for the current total amount 620). Accordingly, as shown in FIG. 9, some example embodiments of the method 700 include operations 710, 720, and 730, with some additional details to accommodate usage of an accumulated account (e.g., available account 510) and its accumulated amount (e.g., available amount 512).

In operation 710, as described above, the GUI generator 210 generates the GUI 400. Here again, the generated GUI 400 indicates a total amount (e.g., initial total amount 410) to be reduced in stages by multiple partial reductions, and then causes presentation of the GUI 400 (e.g., display of the GUI 400 by the server machine 110, by the device 130, or by a display screen communicatively coupled thereto). As before, the GUI 400 includes multiple authorization elements (e.g., authorization elements 430, 432, and 434) that are each separately operable to specify a respective corresponding partial reduction among the multiple partial reductions for the total amount (e.g., the initial total amount 410) indicated by the GUI 400. However, to facilitate usage of an accumulated amount from an accumulated account, the first account is the accumulated account and thus corresponds to the accumulated amount.

In operation 720, as described above, the transaction manager 230 responds to a first authorization element (e.g., authorization element 434) being operated to specify a first partial reduction of the total amount (e.g., the initial total amount 410) along with a first account (e.g., available account 510, which is an accumulated account in such example embodiments) from which to transact a first authorized amount (e.g., authorized amount 435, which is taken from the accumulated amount in such example embodiments) of the first partial reduction. Specifically, the response of the transaction manager 230 is or includes transacting (e.g., executing) the first authorized amount (e.g., authorized amount 435) from the specified first account (e.g., available account 510). As discussed above with respect to operation 810, the input handler 220 may have previously detected the operation of the first authorization element (e.g., authorization element 434) prior to the response thereto by the transaction manager 230 here in operation 720.

In operation 730, as described above, in response to the transacting of the first authorized amount (e.g., authorized amount 435) from the specified first account (e.g., available account 510), the GUI generator 210 modifies (e.g., updates) the GUI 400 to indicate the total amount (e.g., initial total amount 410) and its partial reduction by at least the first authorized amount (e.g., by displaying the first authorized amount, the current total amount 620, or both), which in such example embodiments is taken from the accumulated amount gathered from the periodic series of transactions authorized to occur periodically.

Figure 10:
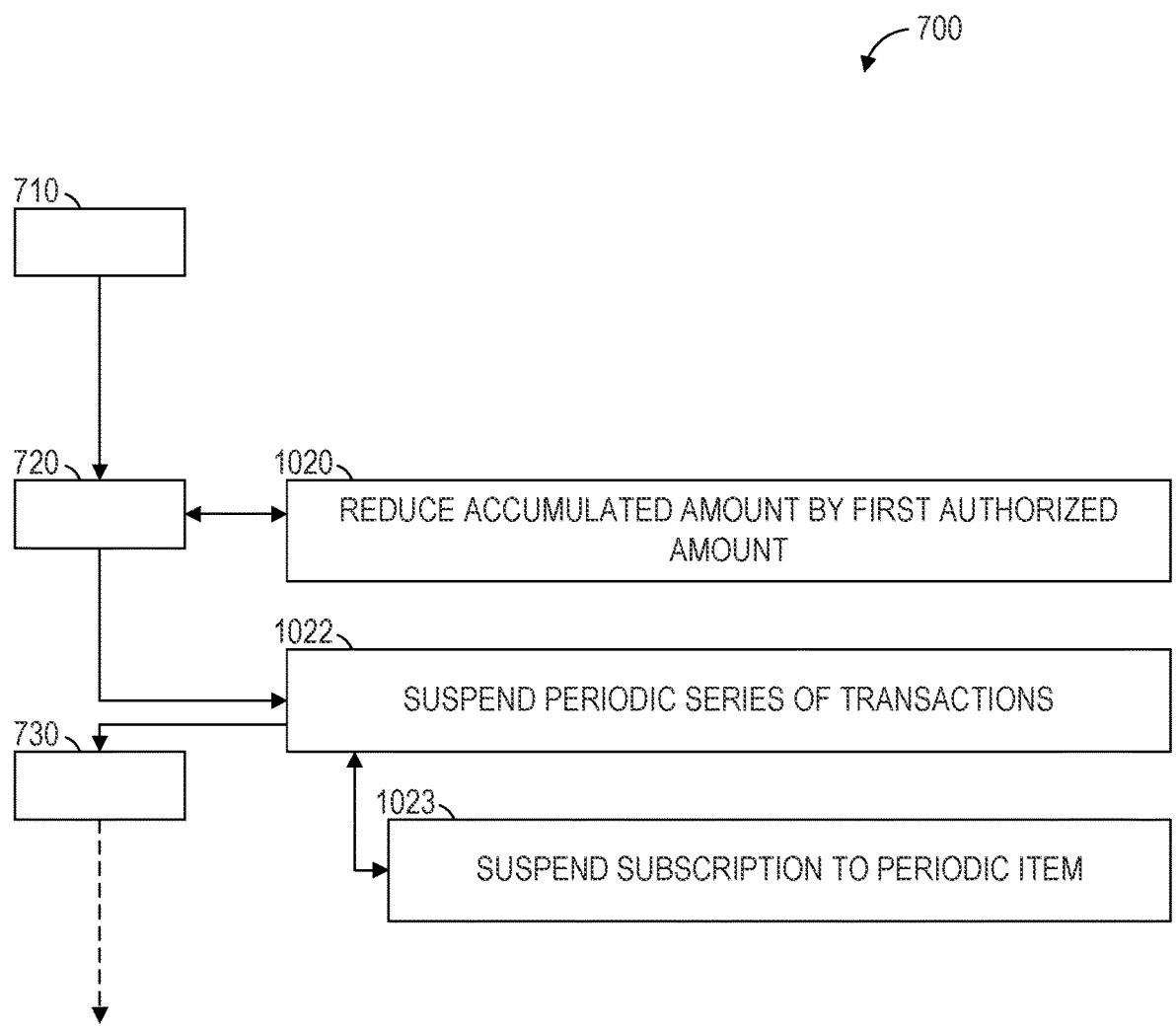

As shown in FIG. 10, in addition to any one or more of the operations previously described, the method 700 may include one or more of operations 1020, 1022, and 1023. Operation 1020 may be performed as part (e.g., a precursor task, a subroutine, or a portion) of operation 720, in which the transaction manager 230 transacts (e.g., executes) the first authorized amount (e.g., authorized amount 435) from the specified first account (e.g., available account 510, which in these example embodiments is an accumulated account). In operation 1020, the transaction manager 230 reduces the accumulated amount of the accumulated account by the first authorized amount (e.g., authorized amount 435), thus completing the specified redirection of some or all of the accumulated amount toward making a partial reduction of the total amount (e.g., initial total amount 410).

Operation 1022 is shown as being performed after operation 720 and before operation 730. In operation 1022, the transaction manager 230 responds to the reducing of the accumulated amount in operation 1020 by suspending the periodic series of transactions, thus discontinuing (e.g., temporarily or permanently) the previously authorized periodic additions into the accumulated account that was previously authorized (e.g., earmarked or otherwise designated) to be exchanged for the subscription to the periodic item.

Operation 1023 may be performed as part (e.g., a precursor task, a subroutine, or a portion) of operation 1022. In operation 1023, the transaction manager 230 responds to the reducing of the accumulated amount in operation 1022 by suspending the subscription to the periodic item, thus discontinuing (e.g., temporarily or permanently) the subscription's benefits (e.g., the periodic item) that previously would have been provided in exchange for the accumulated amount in the accumulated account, had some or all of the accumulated amount not been redirected toward making a partial reduction of the total amount (e.g., initial total amount 410).

According to various example embodiments, one or more of the methodologies described herein may facilitate generation, provision, operation, or any suitable combination thereof, of the GUI 400, which is operable to specify, initiate, and complete multiple partial reductions of a total amount (e.g., initial total amount 410). Moreover, one or more of the methodologies described herein may facilitate prompt causation of a corresponding transaction for each specified partial reduction, which may have the effect of providing robustness to accidental or intentional disruptions in one or more network sessions. Furthermore, one or more of the methodologies described herein may facilitate reallocation or other redirection of an accumulated amount that has been previously allocated or otherwise authorized for a periodic subscription to be instead applied to one or more of the specified partial reductions of the total amount. Hence, one or more of the methodologies described herein may facilitate convenient, flexible, interruptible, and reliable execution of transactions that fulfill the specified partial reductions of the total amount, compared to capabilities of pre-existing systems and methods.

When these effects are considered in aggregate, one or more of the methodologies described herein may obviate a need for certain efforts or resources that otherwise would be involved in facilitating such partial reductions of total amounts. Efforts expended by a user in conducting a sequential series of individual transactions to reduce a total amount in stages may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 11:
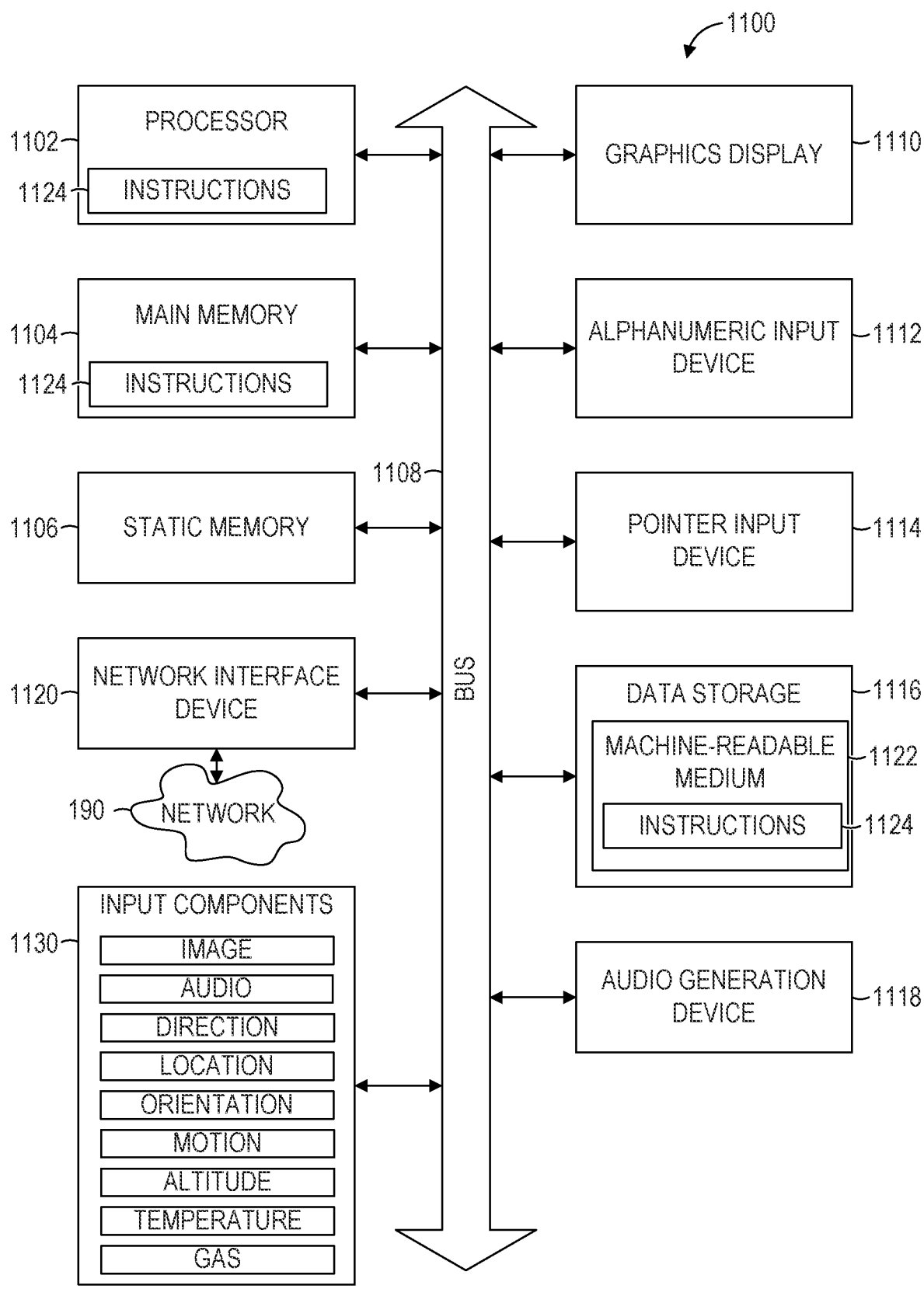
FIG. 11 is a block diagram illustrating components of a machine, according to some example embodiments, able to read instructions from a machine-readable medium and perform any one or more of the methodologies discussed herein.

FIG. 11 is a block diagram illustrating components of a machine 1100, according to some example embodiments, able to read instructions 1124 from a machine-readable medium 1122 (e.g., a non-transitory machine-readable medium, a machine-readable storage medium, a computer-readable storage medium, or any suitable combination thereof) and perform any one or more of the methodologies discussed herein, in whole or in part. Specifically, FIG. 11 shows the machine 1100 in the example form of a computer system (e.g., a computer) within which the instructions 1124 (e.g., software, a program, an application, an applet, an app, or other executable code) for causing the machine 1100 to perform any one or more of the methodologies discussed herein may be executed, in whole or in part.

In alternative embodiments, the machine 1100 operates as a standalone device or may be communicatively coupled (e.g., networked) to other machines. In a networked deployment, the machine 1100 may operate in the capacity of a server machine or a client machine in a server-client network environment, or as a peer machine in a distributed (e.g., peer-to-peer) network environment. The machine 1100 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include any collection of machines that individually or jointly execute the instructions 1124 to perform all or part of any one or more of the methodologies discussed herein.

The machine 1100 includes a processor 1102 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 1104, and a static memory 1106, which are configured to communicate with each other via a bus 1108. The processor 1102 contains solid-state digital microcircuits (e.g., electronic, optical, or both) that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein. In some example embodiments, the processor 1102 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1100 with at least the processor 1102, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1100 may further include a graphics display 1110 (e.g., a plasma display panel (PDP), a light emitting diode (LED) display, a liquid crystal display (LCD), a projector, a cathode ray tube (CRT), or any other display capable of displaying graphics or video). The machine 1100 may also include an alphanumeric input device 1112 (e.g., a keyboard or keypad), a pointer input device 1114 (e.g., a mouse, a touchpad, a touchscreen, a trackball, a joystick, a stylus, a motion sensor, an eye tracking device, a data glove, or other pointing instrument), a data storage 1116, an audio generation device 1118 (e.g., a sound card, an amplifier, a speaker, a headphone jack, or any suitable combination thereof), and a network interface device 1120.

The data storage 1116 (e.g., a data storage device) includes the machine-readable medium 1122 (e.g., a tangible and non-transitory machine-readable storage medium) on which are stored the instructions 1124 embodying any one or more of the methodologies or functions described herein. The instructions 1124 may also reside, completely or at least partially, within the main memory 1104, within the static memory 1106, within the processor 1102 (e.g., within the processor's cache memory), or any suitable combination thereof, before or during execution thereof by the machine 1100. Accordingly, the main memory 1104, the static memory 1106, and the processor 1102 may be considered machine-readable media (e.g., tangible and non-transitory machine-readable media). The instructions 1124 may be transmitted or received over the network 190 via the network interface device 1120. For example, the network interface device 1120 may communicate the instructions 1124 using any one or more transfer protocols (e.g., hypertext transfer protocol (HTTP)).

In some example embodiments, the machine 1100 may be a portable computing device (e.g., a smart phone, a tablet computer, or a wearable device) and may have one or more additional input components 1130 (e.g., sensors or gauges). Examples of such input components 1130 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components 1130 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 1124 for execution by the machine 1100, such that the instructions 1124, when executed by one or more processors of the machine 1100 (e.g., processor 1102), cause the machine 1100 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 1124 for execution by the machine 1100 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 1124).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions describe various examples of methods, machine-readable media, and systems (e.g., machines, devices, or other apparatus) discussed herein. Any one or more features of an example, taken in isolation or combination, should be considered as being within the disclosure of this application.

A first example provides a method comprising:

causing, by one or more processors of a machine, presentation of a GUI that indicates a total amount to be reduced in stages by multiple partial reductions, the GUI including multiple authorization elements each separately operable to specify a respective corresponding partial reduction among the multiple partial reductions;

by one or more processors of the machine and in response to a first authorization element among the multiple authorization elements being operated to specify a first partial reduction of the total amount along with a first account, among multiple available accounts, from which to transact a first authorized amount of the first partial reduction, transacting the first authorized amount from the specified first account;

by one or more processors of the machine and in response to the transacting of the first authorized amount from the specified first account, modifying the GUI to indicate the total amount and its partial reduction by at least the first authorized amount;

by one or more processors of the machine and in response to a second authorization element among the multiple authorization elements being operated to specify a second partial reduction of the reduced total amount along with a second account, among the multiple available accounts, from which to transact a second authorized amount of the second partial reduction, transacting the second authorized amount from the specified second account; and by one or more processors of the machine and in response to the transacting of the second authorized amount from the specified second account, modifying the GUI to indicate the total amount and its reduction by at least the first authorized amount and the second authorized amount.

A second example provides a method according to the first example, wherein:

the GUI indicates a list of items and item amounts whose sum is included in the indicated total amount to be reduced in stages (e.g., stages of reduction) by the multiple partial reductions;

the transacting of the first authorized amount of the first partial reduction represents a first stage among the stages of reduction of the total amount; and the transacting of the second authorized amount of the second partial reduction represents a second stage among the stages of reduction of the total amount.

A third example provides a method according to the first example or the second example, further comprising:

detecting a closure of the GUI after the transacting of the first authorized amount from the specified first account, the closure of the GUI indicating termination of a first network session; and in response to initiation of a second network session after the modifying of the GUI to indicate the total amount and its partial reduction by at least the first authorized amount, causing a launch of the GUI modified to indicate the total amount and its partial reduction by at least the first authorized amount.

A fourth example provides a method according to the third example, wherein:
the closure of the GUI indicates termination of the first network session at a device, and
the initiation of the second network session occurs at the device at which the first network session terminated.

A fifth example provides a method according to the third example, wherein:
the closure of the GUI indicates termination of the first network session at a first device; and
the initiation of the second network session occurs at a second device distinct from the first device at which the first network session terminated.

A sixth example provides a method according to any of the first through fifth examples, wherein:
the first account among the multiple available accounts corresponds to an accumulated amount gathered from a periodic series of transactions authorized to occur periodically.

A seventh example provides a method according to the sixth example, wherein:
the transacting of the first authorized amount from the specified first account includes reducing the accumulated amount gathered from the periodic series of transactions by the first authorized amount; and
the method further comprises:
in response to the reducing of the accumulated amount gathered from the periodic series of transactions by the first authorized amount, suspending the periodic series of transactions.

An eighth example provides a method according to any of the first through seventh examples, wherein:
the first account among the multiple available accounts corresponds to an accumulated amount gathered from a periodic series of transactions authorized to occur periodically in exchange for a subscription to a periodic item provided periodically.

A ninth example provides a method according to the eighth example, wherein:
the transacting of the first authorized amount from the specified first account includes reducing the accumulated amount gathered from the periodic series of transactions by the first authorized amount; and
the method further comprises:
in response to the reducing of the accumulated amount gathered from the periodic series of transactions by the first authorized amount, suspending the subscription to the periodic item.

A tenth example provides a machine-readable medium (e.g., a non-transitory machine-readable storage medium) comprising instructions that, when executed by one or more processors of a machine, cause the machine to perform operations comprising:
causing presentation of a GUI that indicates a total amount to be reduced in stages by multiple partial reductions, the GUI including multiple authorization elements each separately operable to specify a respective corresponding partial reduction among the multiple partial reductions;
in response to a first authorization element among the multiple authorization elements of the presented GUI being operated to specify a first partial reduction of the total amount along with a first account, among multiple available accounts, from which to transact a first authorized amount of the first partial reduction, transacting the first authorized amount from the specified first account;
in response to the transacting of the first authorized amount from the specified first account, modifying the GUI to indicate the total amount and its partial reduction by at least the first authorized amount;
in response to a second authorization element among the multiple authorization elements being operated to specify a second partial reduction of the reduced total amount along with a second account, among the multiple available accounts, from which to transact a second authorized amount of the second partial reduction, transacting the second authorized amount from the specified second account; and
in response to the transacting of the second authorized amount from the specified second account, modifying the GUI to indicate the total amount and its reduction by at least the first authorized amount and the second authorized amount.

An eleventh example provides a machine-readable medium according to the tenth example, wherein:
the GUI indicates a list of items and item amounts whose sum is included in the indicated total amount to be reduced in stages by the multiple partial reductions;
the transacting of the first authorized amount of the first partial reduction represents a first stage among the stages of reduction of the total amount; and
the transacting of the second authorized amount of the second partial reduction represents a second stage among the stages of reduction of the total amount.

A twelfth example provides a machine-readable medium according to the tenth example or the eleventh example, wherein the operations further comprise;
detecting a closure of the GUI after the transacting of the first authorized amount from the specified first account, the closure of the GUI indicating termination of a first network session; and
in response to initiation of a second network session after the modifying of the GUI to indicate the total amount and its partial reduction by at least the first authorized amount, causing a launch of the GUI modified to indicate the total amount and its partial reduction by at least the first authorized amount.

A thirteenth example provides a machine-readable medium according to the twelfth example, wherein:
the closure of the GUI indicates termination of the first network session at a device; and
the initiation of the second network session occurs at the device at which the first network session terminated.

A fourteenth example provides a machine-readable medium according to the twelfth example, wherein:
the closure of the GUI indicates termination of the first network session at a first device; and
the initiation of the second network session occurs at a second device distinct from the first device at which the first network session terminated.

A fifteenth example provides a machine-readable medium according to any of the tenth through fourteenth examples, wherein:
the first account among the multiple available accounts corresponds to an accumulated amount gathered from a periodic series of transactions authorized to occur periodically.

A sixteenth example provides a system (e.g., a computer system, a server machine, a mobile device, or any suitable combination thereof) comprising:

one or more processors; and
a memory storing instructions that, when executed by at least one processor among the one or more processors, cause the system to perform operations comprising:
causing presentation of a GUI that indicates a total amount to be reduced in stages by multiple partial reductions, the GUI including multiple authorization elements each separately operable to specify a respective corresponding partial reduction among the multiple partial reductions;
in response to a first authorization element among the multiple authorization elements of the presented GUI being operated to specify a first partial reduction of the total amount along with a first account, among multiple available accounts, from which to transact a first authorized amount of the first partial reduction, transacting the first authorized amount from the specified first account;
in response to the transacting of the first authorized amount from the specified first account, modifying the GUI to indicate the total amount and its partial reduction by at least the first authorized amount;
in response to a second authorization element among the multiple authorization elements being operated to specify a second partial reduction of the reduced total amount along with a second account, among the multiple available accounts, from which to transact a second authorized amount of the second partial reduction, transacting the second authorized amount from the specified second account; and
in response to the transacting of the second authorized amount from the specified second account, modifying the GUI to indicate the total amount and its reduction by at least the first authorized amount and the second authorized amount.

A seventeenth example provides a system according to the sixteenth example, wherein:
the GUI indicates a list of items and item amounts whose sum is included in the indicated total amount to be reduced in stages by the multiple partial reductions;
the transacting of the first authorized amount of the first partial reduction represents a first stage among the stages of reduction of the total amount; and
the transacting of the second authorized amount of the second partial reduction represents a second stage among the stages of reduction of the total amount.

An eighteenth example provides a system according to the sixteenth example or the seventeenth example, wherein the operations further comprise:
detecting a closure of the GUI after the transacting of the first authorized amount from the specified first account, the closure of the GUI indicating termination of a first network session; and
in response to initiation of a second network session after the modifying of the GUI to indicate the total amount and its partial reduction by at least the first authorized amount, causing a launch of the GUI modified to indicate the total amount and its partial reduction by at least the first authorized amount.

A nineteenth example provides a system according to the eighteenth example, wherein:
the closure of the GUI indicates termination of the first network session at a device, and
the initiation of the second network session occurs at the device at which the first network session terminated.

A twentieth example provides a system according to the eighteenth example, wherein:

the closure of the GUI indicates termination of the first network session at a first device; and
the initiation of the second network session occurs at a second device distinct from the first device at which the first network session terminated.

A twenty-first example provides a method comprising:
causing, by one or more processors of a machine, presentation of a GUI that indicates a total amount to be reduced in stages by multiple partial reductions, the GUI including multiple authorization elements each separately operable to specify a respective corresponding partial reduction among the multiple partial reductions;
by one or more processors of the machine and in response to a first authorization element among the multiple authorization elements of the presented GUI being operated to specify a first partial reduction of the total amount along with a first account, among multiple available accounts, from which to transact a first authorized amount of the first partial reduction, transacting the first authorized amount from the specified first account, the first account among the multiple available accounts corresponding to an accumulated amount gathered from a periodic series of transactions authorized to occur periodically; and
by one or more processors of the machine and in response to the transacting of the first authorized amount from the specified first account, modifying the GUI to indicate the total amount and its partial reduction by at least the first authorized amount taken from the accumulated amount gathered from the periodic series of transactions authorized to occur periodically.

A twenty-second example provides a method according to the twenty-first example, wherein:
the transacting of the first authorized amount from the specified first account includes reducing the accumulated amount gathered from the periodic series of transactions by the first authorized amount; and
the method further comprises:
in response to the reducing of the accumulated amount gathered from the periodic series of transactions by the first authorized amount, suspending the periodic series of transactions.

A twenty-third example provides a method according to the twenty-first example or the twenty-second example, wherein:
the first account among the multiple available accounts corresponds to the accumulated amount gathered from the periodic series of transactions authorized to occur periodically in exchange for a subscription to a periodic item provided periodically.

A twenty-fourth example provides a method according to the twenty-third example, wherein:
the transacting of the first authorized amount from the specified first account includes reducing the accumulated amount gathered from the periodic series of transactions by the first authorized amount; and
the method further comprises:
in response to the reducing of the accumulated amount gathered from the periodic series of transactions by the first authorized amount, suspending the subscription to the periodic item.

A twenty-fifth example provides a method according to any of the twenty-first through twenty-fourth examples, further comprising:
in response to a second authorization element among the multiple authorization elements being operated to specify a second partial reduction of the reduced total amount along with a second account, among the multiple available accounts, from which to transact a second authorized amount of the second partial reduction, transacting the second authorized amount from the specified second account; and in response to the transacting of the second authorized amount from the specified second account, modifying the GUI to indicate the total amount and its reduction by at least the first authorized amount and the second authorized amount.

A twenty-sixth example provides a method according to any of the twenty-first through twenty-fifth examples, wherein:

the GUI indicates a list of items and item amounts whose sum is included in the indicated total amount to be reduced in stages by the multiple partial reductions; and the transacting of the first authorized amount of the first partial reduction represents a first stage among the stages of reduction of the total amount.

A twenty-seventh example provides a method according to any of the twenty-first through twenty-sixth examples, further comprising:

detecting a closure of the GUI after the transacting of the first authorized amount from the specified first account, the closure of the GUI indicating termination of a first network session; and in response to initiation of a second network session after the modifying of the GUI to indicate the total amount and its partial reduction by at least the first authorized amount, causing a launch of the GUI modified to indicate the total amount and its partial reduction by at least the first authorized amount.

A twenty-eighth example provides a method according to the twenty-seventh example, wherein:

the closure of the GUI indicates termination of the first network session at a device, and the initiation of the second network session occurs at the device at which the first network session terminated.

A twenty-ninth example provides a method according to the twenty-seventh example, wherein:

the closure of the GUI indicates termination of the first network session at a first device; and the initiation of the second network session occurs at a second device distinct from the first device at which the first network session terminated.

A thirtieth example provides a machine-readable medium (e.g., a non-transitory machine-readable storage medium) comprising instructions that, when executed by one or more processors of a machine, cause the machine to perform operations comprising:

causing presentation of a GUI that indicates a total amount to be reduced in stages by multiple partial reductions, the GUI including multiple authorization elements each separately operable to specify a respective corresponding partial reduction among the multiple partial reductions;

in response to a first authorization element among the multiple authorization elements of the presented GUI being operated to specify a first partial reduction of the total amount along with a first account, among multiple available accounts, from which to transact a first authorized amount of the first partial reduction, transacting the first authorized amount from the specified first account, the first account among the multiple available accounts corresponding to an accumulated amount gathered from a periodic series of transactions authorized to occur periodically; and in response to the transacting of the first authorized amount from the specified first account, modifying the GUI to indicate the total amount and its partial reduction by at least the first authorized amount taken from the accumulated amount gathered from the periodic series of transactions authorized to occur periodically.

A thirty-first example provides a machine-readable medium according to the thirtieth example, wherein:

the transacting of the first authorized amount from the specified first account includes reducing the accumulated amount gathered from the periodic series of transactions by the first authorized amount; and the operations further comprise:

in response to the reducing of the accumulated amount gathered from the periodic series of transactions by the first authorized amount, suspending the periodic series of transactions.

A thirty-second example provides a machine-readable medium according to the thirtieth example or the thirty-first example, wherein:

the first account among the multiple available accounts corresponds to the accumulated amount gathered from the periodic series of transactions authorized to occur periodically in exchange for a subscription to a periodic item provided periodically.

A thirty-third example provides a machine-readable medium according to the thirty-second example, wherein:

the transacting of the first authorized amount from the specified first account includes reducing the accumulated amount gathered from the periodic series of transactions by the first authorized amount; and the operations further comprise:

in response to the reducing of the accumulated amount gathered from the periodic series of transactions by the first authorized amount, suspending the subscription to the periodic item.

A thirty-fourth example provides a machine-readable medium according to any of the thirtieth through thirty-third examples, wherein the operations further comprise:

in response to a second authorization element among the multiple authorization elements being operated to specify a second partial reduction of the reduced total amount along with a second account, among the multiple available accounts, from which to transact a second authorized amount of the second partial reduction, transacting the second authorized amount from the specified second account; and in response to the transacting of the second authorized amount from the specified second account, modifying the GUI to indicate the total amount and its reduction by at least the first authorized amount and the second authorized amount.

A thirty-fifth example provides a machine-readable medium according to any of the thirtieth through thirty-fourth examples, wherein:

the GUI indicates a list of items and item amounts whose sum is included in the indicated total amount to be reduced in stages by the multiple partial reductions; and the transacting of the first authorized amount of the first partial reduction represents a first stage among the stages of reduction of the total amount.

A thirty-sixth example provides a system (e.g., a computer system, a server machine, a mobile device, or any suitable combination thereof) comprising:

one or more processors; and
a memory storing instructions that, when executed by at least one processor among the one or more processors, cause the system to perform operations comprising:
causing presentation of a graphical user interface (GUI) that indicates a total amount to be reduced in stages by multiple partial reductions, the GUI including multiple authorization elements each separately operable to specify a respective corresponding partial reduction among the multiple partial reductions;
in response to a first authorization element among the multiple authorization elements of the presented GUI being operated to specify a first partial reduction of the total amount along with a first account, among multiple available accounts, from which to transact a first authorized amount of the first partial reduction, transacting the first authorized amount from the specified first account, the first account among the multiple available accounts corresponding to an accumulated amount gathered from a periodic series of transactions authorized to occur periodically; and
in response to the transacting of the first authorized amount from the specified first account, modifying the GUI to indicate the total amount and its partial reduction by at least the first authorized amount taken from the accumulated amount gathered from the periodic series of transactions authorized to occur periodically.

A thirty-seventh example provides a system according to the thirty-sixth example, wherein:
the transacting of the first authorized amount from the specified first account includes reducing the accumulated amount gathered from the periodic series of transactions by the first authorized amount; and
the operations further comprise:
in response to the reducing of the accumulated amount gathered from the periodic series of transactions by the first authorized amount, suspending the periodic series of transactions.

A thirty-eighth example provides a system according to the thirty-sixth example or the thirty-seventh example, wherein:
the first account among the multiple available accounts corresponds to the accumulated amount gathered from the periodic series of transactions authorized to occur periodically in exchange for a subscription to a periodic item provided periodically.

A thirty-ninth example provides a system according to the thirty-eighth example, wherein:
the transacting of the first authorized amount from the specified first account includes reducing the accumulated amount gathered from the periodic series of transactions by the first authorized amount; and
the operations further comprise:
in response to the reducing of the accumulated amount gathered from the periodic series of transactions by the first authorized amount, suspending the subscription to the periodic item.

A fortieth example provides a system according to any of the thirty-sixth through thirty-ninth examples, wherein the operations further comprise:
in response to a second authorization element among the multiple authorization elements being operated to specify a second partial reduction of the reduced total amount along with a second account, among the multiple available accounts, from which to transact a second authorized amount of the second partial reduction, transacting the second authorized amount from the specified second account; and
in response to the transacting of the second authorized amount from the specified second account, modifying the GUI to indicate the total amount and its reduction by at least the first authorized amount and the second authorized amount.

A forty-first example provides a carrier medium carrying machine-readable instructions for controlling a machine to carry out the operations (e.g., method operations) performed in any one of the previously described examples.

What is claimed is:

1. A method comprising:
accessing, by one or more processors, a graphical user interface (GUI) that indicates a total amount to be reduced and including authorization elements each usable to specify a corresponding partial reduction;
consuming, by the one or more processors and in response to a first authorization element among the authorization elements being used to specify a first partial reduction of the total amount along with a first account from which to consume a first authorized amount of the first partial reduction, the first authorized amount from the specified first account;
modifying, by the one or more processors and in response to the consuming of the first authorized amount, the GUI to indicate the total amount and its partial reduction by at least the first authorized amount;
detecting, by the one or more processors, a closure of the GUI at a first device after the consuming of the first authorized amount, the closure of the GUI indicating termination of a first network session at the first device;
causing, by the one or more processors, in response to the closure of the GUI and in response to initiation of a second network session at a second device and after the modifying of the GUI, a launch of the GUI at the second device, the GUI being modified to indicate the total amount and its partial reduction by at least the first authorized amount;
consuming, by the one or more processors and in response to a second authorization element among the authorization elements being used to specify a second partial reduction of the reduced total amount along with a second account from which to consume a second authorized amount of the second partial reduction, the second authorized amount from the specified second account; and
modifying, by the one or more processors and in response to the consuming of the second authorized amount, the GUI to indicate the total amount and its reduction by at least the first authorized amount and the second authorized amount.

2. The method of claim 1, wherein:
the GUI lists items and corresponding item amounts whose sum is included in the total amount.

3. The method of claim 1, wherein:
the total amount is to be reduced in stages;
the consuming of the first authorized amount of the first partial reduction represents a first stage among the stages of reduction of the total amount; and
the consuming of the second authorized amount of the second partial reduction represents a second stage among the stages of reduction of the total amount.

4. The method of claim 1, wherein:
the first account from which to consume the first authorized amount corresponds to an accumulated amount gathered from periodic allocations of a repeatable amount.

5. The method of claim 4, wherein:
the consuming of the first authorized amount of the first partial reduction includes reducing the accumulated amount gathered from the periodic allocations by the first authorized amount; and
the method further comprises:
in response to the reducing of the accumulated amount, suspending the periodic allocations of the repeatable amount.

6. The method of claim 1, wherein:
the first account from which to consume the first authorized amount corresponds to an accumulated amount gathered from periodic allocations of a repeatable amount in exchange for a subscription to a periodic item to be provided periodically.

7. The method of claim 6, wherein:
the consuming of the first authorized amount of the first partial reduction includes reducing the accumulated amount gathered from the periodic allocations by the first authorized amount; and
the method further comprises:
in response to the reducing of the accumulated, suspending the subscription to the periodic item.

8. A non-transitory machine-readable storage medium comprising instructions that, when executed by one or more processors of a machine, cause the machine to perform operations comprising:
accessing a graphical user interface (GUI) that indicates a total amount to be reduced and including authorization elements each usable to specify a corresponding partial reduction;
consuming, in response to a first authorization element among the authorization elements being used to specify a first partial reduction of the total amount along with a first account from which to consume a first authorized amount of the first partial reduction, the first authorized amount from the specified first account;
modifying, in response to the consuming of the first authorized amount, the GUI to indicate the total amount and its partial reduction by at least the first authorized amount;
detecting a closure of the GUI at a first device after the consuming of the first authorized amount, the closure of the GUI indicating termination of a first network session at the first device;
causing, in response to the closure of the GUI and in response to initiation of a second network session at a second device and after the modifying of the GUI, a launch of the GUI at the second device, the GUI being modified to indicate the total amount and its partial reduction by at least the first authorized amount;
consuming, in response to a second authorization element among the authorization elements being used to specify a second partial reduction of the reduced total amount along with a second account from which to consume a second authorized amount of the second partial reduction, the second authorized amount from the specified second account; and
modifying, in response to the consuming of the second authorized amount, the GUI to indicate the total amount and its reduction by at least the first authorized amount and the second authorized amount.

9. The non-transitory machine-readable storage medium of claim 8, wherein: the GUI lists items and corresponding item amounts whose sum is included in the total amount.

10. The non-transitory machine-readable storage medium of claim 8, wherein:
the total amount is to be reduced in stages;
the consuming of the first authorized amount of the first partial reduction represents a first stage among the stages of reduction of the total amount; and
the consuming of the second authorized amount of the second partial reduction represents a second stage among the stages of reduction of the total amount.

11. The non-transitory machine-readable storage medium of claim 8, wherein:
the first account from which to consume the first authorized amount corresponds to an accumulated amount gathered from periodic allocations of a repeatable amount.

12. The non-transitory machine-readable storage medium of claim 11, wherein:
the consuming of the first authorized amount of the first partial reduction includes reducing the accumulated amount gathered from the periodic allocations by the first authorized amount; and
the operations further comprise:
in response to the reducing of the accumulated amount, suspending the periodic allocations of the repeatable amount.

13. The non-transitory machine-readable storage medium of claim 8, wherein:
the first account from which to consume the first authorized amount corresponds to an accumulated amount gathered from periodic allocations of a repeatable amount in exchange for a subscription to a periodic item to be provided periodically.

14. The non-transitory machine-readable storage medium of claim 13, wherein:
the consuming of the first authorized amount of the first partial reduction includes reducing the accumulated amount gathered from the periodic allocations by the first authorized amount; and
the operations further comprise:
in response to the reducing of the accumulated, suspending the subscription to the periodic item.

15. A system comprising:
one or more processors; and
a memory storing instructions that, when executed by at least one processor among the one or more processors, cause the system to perform operations comprising:
accessing a graphical user interface (GUI) that indicates a total amount to be reduced and including authorization elements each usable to specify a corresponding partial reduction;
consuming, in response to a first authorization element among the authorization elements being used to specify a first partial reduction of the total amount along with a first account from which to consume a first authorized amount of the first partial reduction, the first authorized amount from the specified first account;
modifying, in response to the consuming of the first authorized amount, the GUI to indicate the total amount and its partial reduction by at least the first authorized amount;
detecting a closure of the GUI at a first device after the consuming of the first authorized amount, the closure of the GUI indicating termination of a first network session at the first device;

causing, in response to the closure of the GUI and in response to initiation of a second network session at a second device and after the modifying of the GUI, a launch of the GUI at the second device, the GUI being modified to indicate the total amount and its partial reduction by at least the first authorized amount;

consuming, in response to a second authorization element among the authorization elements being used to specify a second partial reduction of the reduced total amount along with a second account from which to consume a second authorized amount of the second partial reduction, the second authorized amount from the specified second account; and modifying, in response to the consuming of the second authorized amount, the GUI to indicate the total amount and its reduction by at least the first authorized amount and the second authorized amount.

16. The system of claim 15, wherein:

the total amount is to be reduced in stages;

the consuming of the first authorized amount of the first partial reduction represents a first stage among the stages of reduction of the total amount; and the consuming of the second authorized amount of the second partial reduction represents a second stage among the stages of reduction of the total amount.

17. The system of claim 15, wherein:

the first account from which to consume the first authorized amount corresponds to an accumulated amount gathered from periodic allocations of a repeatable amount.

18. The system of claim 17, wherein:

the consuming of the first authorized amount of the first partial reduction includes reducing the accumulated amount gathered from the periodic allocations by the first authorized amount; and the operations further comprise:

in response to the reducing of the accumulated amount, suspending the periodic allocations of the repeatable amount.

19. The system of claim 15, wherein:

the first account from which to consume the first authorized amount corresponds to an accumulated amount gathered from periodic allocations of a repeatable amount in exchange for a subscription to a periodic item to be provided periodically.

20. The system of claim 19, wherein:

the consuming of the first authorized amount of the first partial reduction includes reducing the accumulated amount gathered from the periodic allocations by the first authorized amount; and the operations further comprise:

in response to the reducing of the accumulated, suspending the subscription to the periodic item.

* * * * *